United States Patent
Mimura et al.

(10) Patent No.: US 8,144,623 B2
(45) Date of Patent: Mar. 27, 2012

(54) METHOD AND APPARATUS FOR AUTOMATICALLY SETTING IP ADDRESS

(75) Inventors: Shinichi Mimura, Mishima (JP); Atsushi Akiyama, Tagata-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 156 days.

(21) Appl. No.: 12/365,343

(22) Filed: Feb. 4, 2009

(65) Prior Publication Data

US 2009/0196292 A1 Aug. 6, 2009

Related U.S. Application Data

(60) Provisional application No. 61/026,030, filed on Feb. 4, 2008.

(51) Int. Cl.
*H04L 12/28* (2006.01)
(52) U.S. Cl. .......................................... 370/254
(58) Field of Classification Search ................. None
See application file for complete search history.

(56) References Cited

U.S. PATENT DOCUMENTS

| | | | |
|---|---|---|---|
| 6,895,007 B1* | 5/2005 | Teraoka | 370/392 |
| 7,215,668 B2* | 5/2007 | Saito | 370/392 |
| 7,710,967 B2* | 5/2010 | Popoviciu et al. | 370/392 |
| 2007/0047550 A1* | 3/2007 | Takayama | 370/392 |
| 2008/0263353 A1* | 10/2008 | Droms et al. | 713/153 |

FOREIGN PATENT DOCUMENTS

JP 2003-134116 5/2003

OTHER PUBLICATIONS

RFC 2462, "IPv6 Stateless Address Autoconfiguration", Dec. 1998.*

* cited by examiner

*Primary Examiner* — Ayaz Sheikh
*Assistant Examiner* — Blanche Wong
(74) *Attorney, Agent, or Firm* — Turocy & Watson, LLP

(57) ABSTRACT

An embodiment of the present invention relates to a method of setting an IP address of an electronic apparatus including receiving a router advertisement transmitted from the router, receiving prefix information of the router advertisement, additionally storing an IP address based upon the received prefix information as an IP address of the electronic apparatus when the electronic apparatus has setting for maintaining the prefix information, and rewriting a presently registered IP address with an IP address based upon the received prefix information when the electronic apparatus does not have the setting for maintaining the prefix information.

18 Claims, 4 Drawing Sheets

| | Prefix | MAC address | Keep configuration flag |
|---|---|---|---|
| Router 1 | fd00:1::/64 | 00:00:00:00:00:01 | 1 |
| Router 1 | fd00:3::/64 | 00:00:00:00:00:01 | 1 |
| Router 2 | fd00:4::/64 | 00:00:00:00:00:02 | 1 |
| Router 3 | fd00:5::/64 | 00:00:00:00:00:03 | 1 |
| Router 4 | fd00:6::/64 | 00:00:00:00:00:04 | 1 |

F I G. 3

METHOD AND APPARATUS FOR AUTOMATICALLY SETTING IP ADDRESS

CROSS-REFERENCE TO RELATED APPLICATION

This application is based upon and claims the benefit of priority from U.S. Provisional Application No. 61/026,030 filed on Feb. 4, 2008, the entire contents of each of which are incorporated herein by reference.

TECHNICAL FIELD

The present invention relates to an electronic apparatus that operates on a network.

BACKGROUND

An electronic apparatus, for example, an image forming apparatus called MFP (Multi-Functional Peripheral) located on a network is connected to a router. The router is connected to a personal computer (a host apparatus) as a client or a server. Therefore, the MFP functions as a network printer or a scanner.

A client and an MFP that adopt a specific OS (operating system), for example, the Windows (trademark) series OS of Microsoft Corporation operate on a network that adopts IPv6 (Internet Protocol ver. 6) as a network interface.

A router corresponding to IPv6 allocates IP (Internet Protocol) addresses (stateless addresses) to the client and the MFP (stateless address autoconfiguration). The MFP acquires an IP address based upon a router advertisement (hereinafter referred to as RA) transmitted from the router in the network that adopts IPv6 as the network interface.

Therefore, when a setting on the router side is changed, the MFP connected to the network environment that adopts IPv6 as the network interface may become unrecognizable by the client or the server. When prefix information of the RA transmitted from the router is changed or when a term of validity of a prefix expires, the IP address is deleted regardless of convenience on the host side.

The router used in the network environment that adopts IPv6 as the network interface can automatically grant an IP address. The IP address automatically granted by the router is a stateless address. A system for granting the IP address is stateless address autoconfiguration. The automatically-granted IP address includes 128 bits in total, higher order 64 bits of which are defined by the router and lower order 64 bits of which are a MAC (Media Access Control) address.

For example, JP-A-2003-134116 (Patent Document 1) discloses that, in a network that adopts a DNS (Domain Name System), inconsistency and mismatch of address information is prevented from occurring between a server and an image processing apparatus that is turned on and off independently from the server.

However, Patent Document 1 does not indicate expansion to the network environment that adopts IPv6 as the network interface.

SUMMARY

It is an object of the present invention to provide an electronic apparatus connected to a network that adopts IPv6 as a network interface, the electronic apparatus having persistence in services in that a change in prefix information of an RA (Router Advertisement) transmitted from a router does not affect the services.

According to an aspect of the present invention, there is provided a method of automatically setting an IP address of an electronic apparatus connected to a router via a network, the method including: receiving a router advertisement transmitted from the router; receiving prefix information of the router advertisement; additionally storing an IP address based upon the received prefix information as an IP address of the electronic apparatus when the electronic apparatus has setting for maintaining the prefix information; and rewriting a presently registered IP address with an IP address based upon the received prefix information when the electronic apparatus does not have the setting for maintaining the prefix information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3 is a diagram of an example of a setting screen displayed on a display unit shown in FIG. 2;

DETAILED DESCRIPTION

An embodiment of the present invention is explained in detail below with reference to the accompanying drawings.

Figure 1:
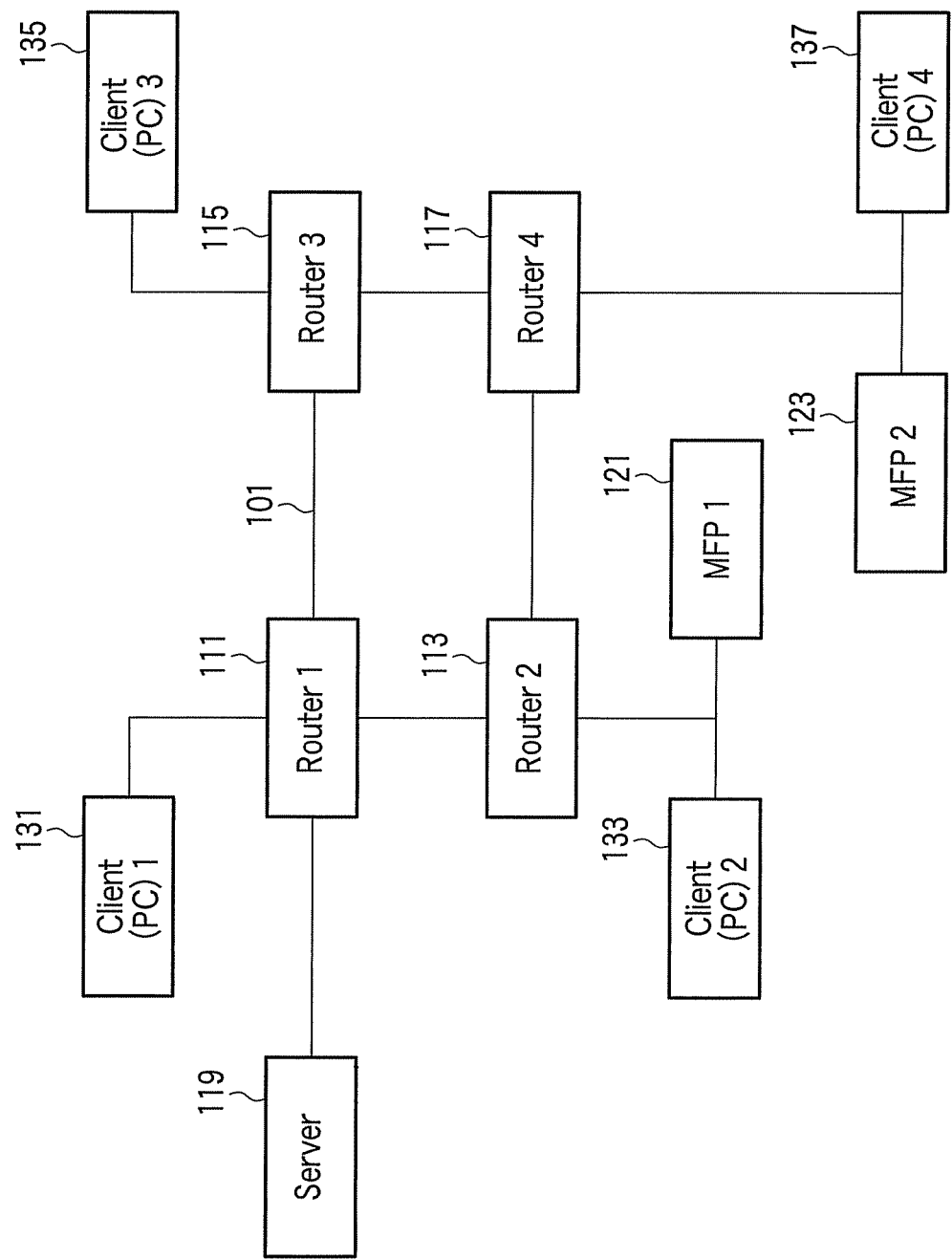
FIG. 1 is a diagram of an example of a network located in an image forming apparatus (a multi-functional peripheral (MFP)) according to an embodiment of the present invention.

FIG. 1 is a diagram of an example of an electronic apparatus (an MFP (Multi-Functional Peripheral), i.e., an image forming apparatus) according to the embodiment connected to a network that adopts IPv6 (Internet Protocol ver. 6) as a network interface.

A network 101 shown in FIG. 1 includes, for example, four routers 111, 113, 115, and 117 and at least one server 119. At least two (first and second) MFPs (electronic apparatuses) 121 and 123 are connected to the network 101. At least four (first to fourth) clients (electronic apparatuses, e.g., personal computers) 131, 133, 135, and 137 are also connected to the network 101.

Figures 2, 4:
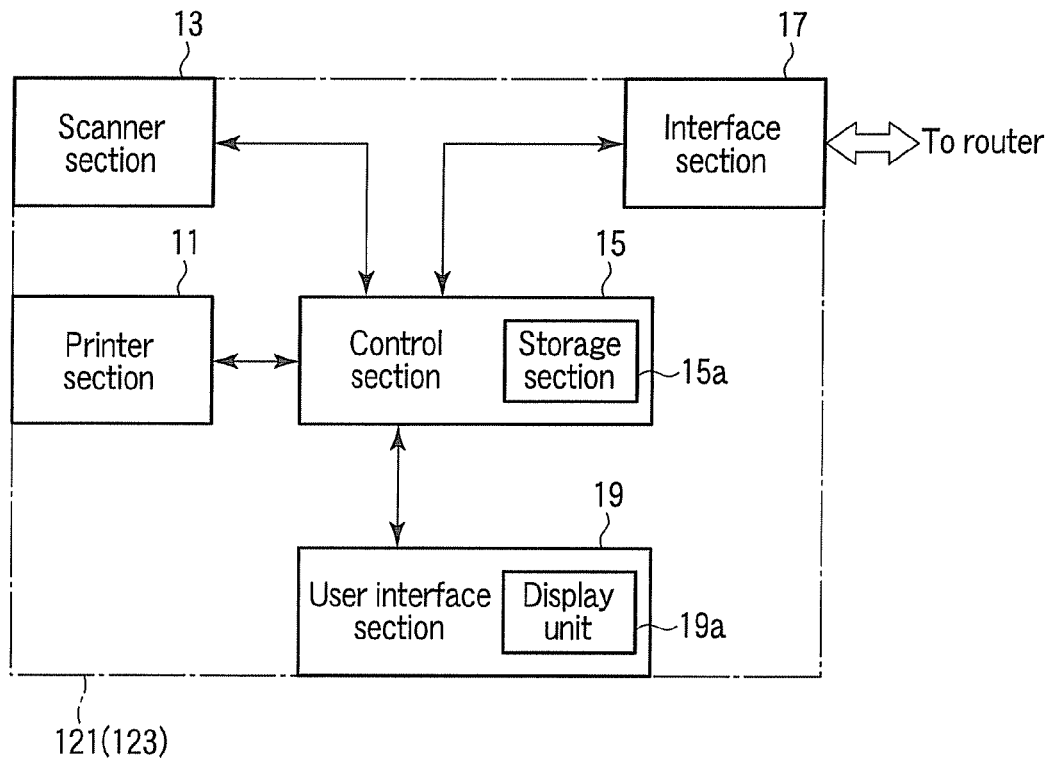
FIG. 2 is a diagram of a configuration of the MFP used in the network shown in FIG. 1.
FIG. 4 is a table (a memory map) of an example of setting of "Keep Configuration"

As indicated by an example shown in FIG. 2, each of the first and second MFPs 121 and 123 includes a printer section (an image forming unit) 11, a scanner section (an image input unit) 13, a control section (a control unit) 15, an interface section (a communication unit) 17, and a user interface section (a user interactive unit) 19. The user interactive unit 19 includes a display unit 19a that displays input information. The control unit 15 includes a storage section (a storage unit) 15a that stores control (setting) information, image information, and the like.

The communication unit 17 exchanges control signals and image information with unspecified clients through arbitrary ones of the routers 111, 113, 115, and 117. The communication unit 17 exchanges control signals and image information with the server 119 through arbitrary one of the routers 111, 113, 115, and 117.

The image forming unit 11 includes, for example, an electrophotographic system, a thermal transfer system, or an inkjet system.

The image input unit 13 is an arbitrary system that can obtain image information by photoelectrically converting, for example, reflected light or transmitted light obtained by illuminating a target image or text.

The control unit 15 controls, according to a control input from a client or a server through the user interactive unit 19 or the communication unit 17, acquisition of an image output by the image forming unit 11 and acquisition of image information by the image input unit 13 and supplies the image information to the communication unit 17 when necessary. The control unit 15 processes control information (setting) and the like for the image forming unit 11, the image input unit 13, and the communication unit 17.

The control unit 15 controls, according to a control input from a router or a server through the communication unit 17, acquisition of an image output by the image forming unit 11 and acquisition of image information by the image input unit 13 and supplies the image information to the communication unit 17 when necessary. The control unit 15 processes control information (setting) and the like for the image forming unit 11, the image input unit 13, and the communication unit 17.

The first and second MFPs 121 and 123 connected to the network 101 shown in FIG. 1 have IP addresses provided by, for example, the first router 111 according to the stateless address autoconfiguration. Each of the IP addresses provided according to the stateless address configuration includes 128 bits in total, higher order 64 bits of which are defined by the router 111 and lower order 64 bits are a MAC (Media Access Control) address.

The IP addresses granted to the first and second MFPs 121 and 123 by the first router 111 have a "term of validity" according to IPv6. The IP addresses are based upon a router advertisement (RA) transmitted by the router 111. Therefore, when prefix information of the IP addresses is changed or the term of validity of the prefix expires, the router 111 deletes the old IP addresses regardless of convenience on a host side (a client or a server).

Therefore, when an environment of the network 101 is changed and the IP addresses based upon the prefix information are changed according to a setting change or the like on the router 111 (113) side, the first and second MFPs 121 and 123 may suddenly become unrecognizable by a communication partner (the client or the server) that already makes connection to the first and second MFPs 121 and 123 using the IP addresses. In this case, inconvenience such as service suspension may occur.

Figure 3:
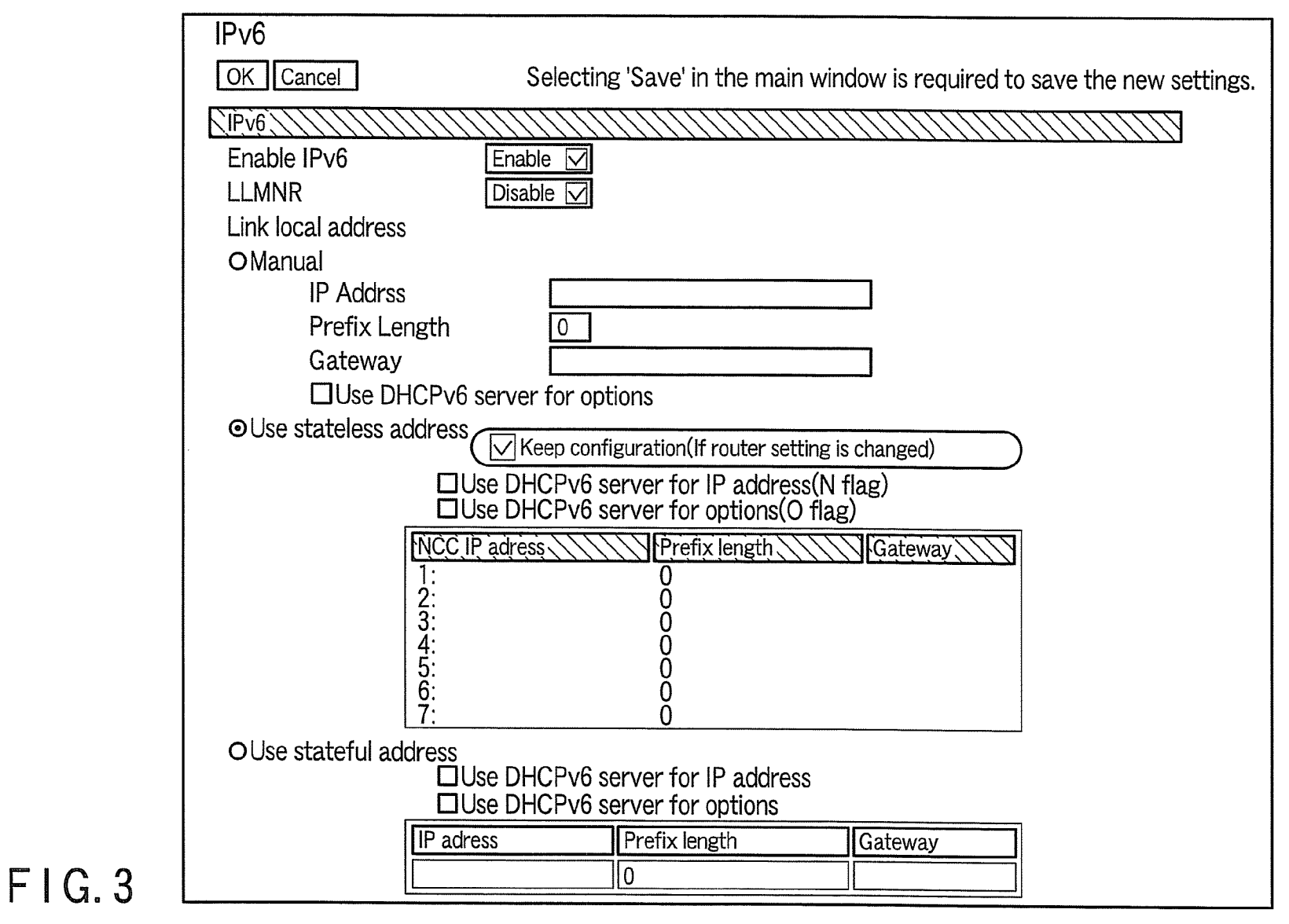

On the basis of such a background, in each of the first and second MFPs 121 and 123 connected to the network that adopts IPv6 as the network interface, 'valid" or 'invalid' of "Keep Configuration" peculiar to IPv6 is set. As the setting of "Keep Configuration", for example, a setting program stored in the storage unit 15a is started from an administrator PC connected via the user interactive unit 19 or a network (not shown) and a check box of "Keep Configuration" is checked in a setting screen (displayed on the display unit 19a), a display example of which is shown in FIG. 3. Consequently, "Keep Configuration" is set 'valid'. In other words, as indicated by an example shown in FIG. 4, when "1" indicates 'valid', a "Keep Configuration Flag" prepared in a predetermined area is set to '1'.

"Keep Configuration" being 'valid' means that, as indicated by an example shown in FIG. 4, when prefix information of an RA provided by a router is changed or when a term of validity of a prefix expires, prefix information of an RA provided by the router anew (i.e., an IP address transmitted to a target MFP by the router and indicated as 'fd00:3::/64' in FIG. 4) is added (old prefix information (i.e., an IP address transmitted to the target MFP before by the router and indicated as 'fd00:1::/64' in FIG. 4) is not deleted.

Figure 5:
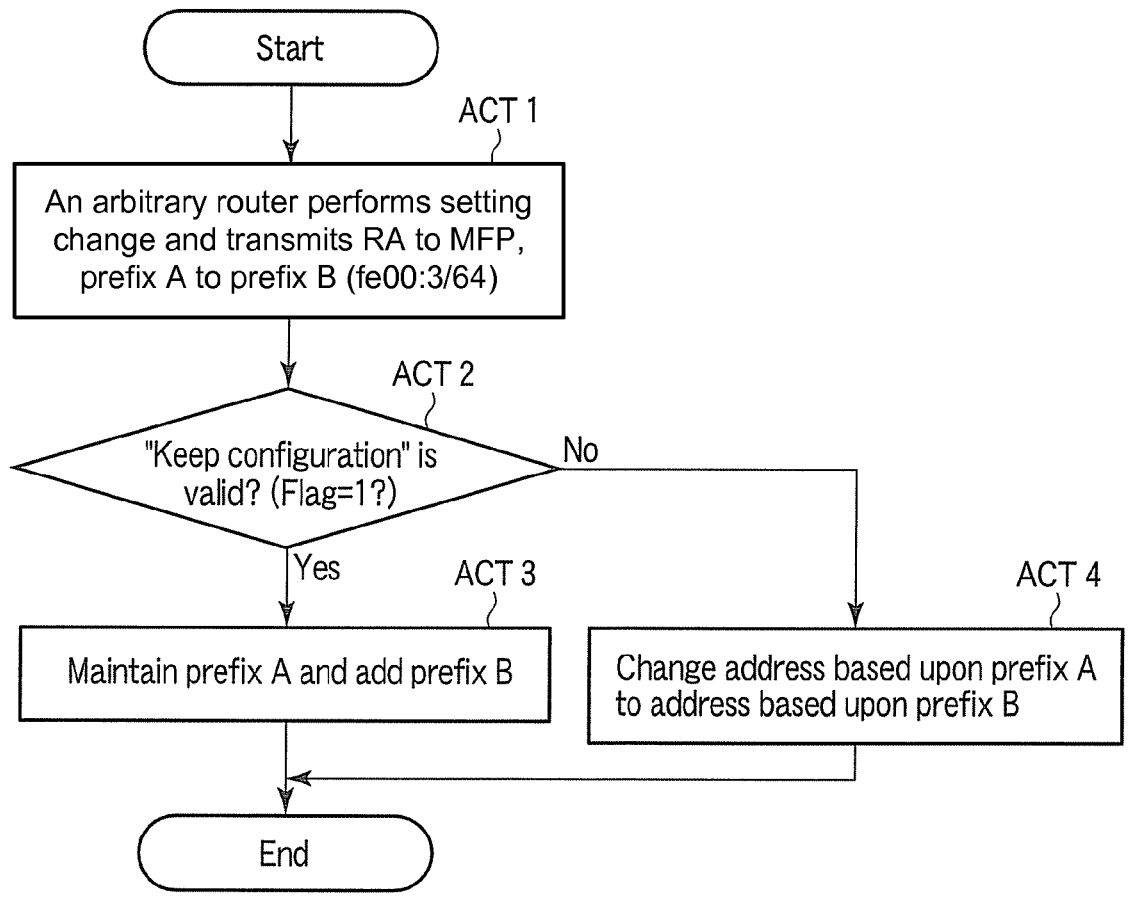
FIG. 5 is a flowchart for explaining setting of "Keep Configuration".

As the setting of 'valid' of "Keep Configuration" in FIG. 3, in terms of software, as indicated by a flowchart of FIG. 5, when there is a setting change in an arbitrary router, the router transmits "RA" to an MFP (ACT 1). An example of "RA" is "change prefix A to prefix B (A=(fe00:1::/64) to B=(fe00:3::/64))" indicating that a (already transmitted) prefix A (fe00:1::/64) is changed to a prefix B (fe00:3::/64).

If "RA" is transmitted in ACT 1, it is determined whether "Keep Configuration" is 'valid', i.e., whether "Keep Configuration Flag" is "1" (Flag=1?) (ACT 2).

If "Keep Configuration Flag" is "0" in ACT 2 (NO in ACT 2), the router changes the (already transmitted) prefix A to the prefix B (ACT 4).

If "Keep Configuration Flag" is "1" in ACT 2 (YES in ACT 2), the router maintains the (already transmitted) prefix A and adds the prefix B (ACT 3).

As a method of storing an IP address similar to the setting of 'valid' of "Keep Configuration", "infinity (understood as "fixed")" peculiar to IPv6 may be transmitted by "RA".

As explained above, in the network environment that adopts IPv6 as the network interface, when a prefix is changed on the router side, a notification of a change of the prefix is transmitted from the router to a host (an electronic apparatus), i.e., a client, for example, a personal computer, or a server or an MFP (the router transmits the prefix to the client or, the server or the MFP). Similarly, when a term of validity of the prefix expires, update (deletion) of the prefix is performed.

A maximum number of IP addresses that can be stored is seven. When an IP address is added anew exceeding the maximum number of IP addresses, an oldest IP address is deleted.

However, by setting "Keep Configuration" 'valid' such that the IP address can be permanently used unless a user explicitly permits change or deletion of the IP address, it is possible to prevent a prefix (transmitted to that point) from being updated. An IP address based upon new prefix information is added.

By adopting such a configuration, even if a network environment is changed because of a setting change of a router or the like, it is possible to prevent a change of a prefix from affecting services and impart persistence to the services.

Therefore, the electronic apparatus (an MFP) connected to the network that adopts IPv6 as the network interface can persistently output an image output according to a request from a client (services are not stopped).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of automatically setting an IP address of an electronic apparatus connected to a router via a network, the method comprising:
receiving, by the electronic apparatus, a router advertisement transmitted from the router;
extracting prefix information from the received router advertisement;
detecting, in the electronic apparatus, whether a keep configuration setting for maintaining an old prefix information is set;
storing, in response to the keep configuration setting being set, an IP address associated with the prefix information as an IP address of the electronic apparatus; and
maintaining, in response to the keep configuration setting not being set, an IP address that was previously stored.

2. The method of claim 1, wherein the detecting is performed based at least in part upon the receiving of the router advertisement.

3. The method of claim 1, wherein
the electronic apparatus can store a maximum of seven prefix information instances, and
in response to the number of prefix information instances exceeding the maximum, the oldest prefix information instance is deleted.

4. An electronic apparatus comprising:
a network interface section configured to receive prefix information of an IP address from a router;
a storage section configured to store the prefix information received by the network interface section from the router;
a detecting section configured to detect whether a keep configuration for maintaining the prefix information is set; and
a control section configured to set a usage of whether to use either the prefix information stored in the storage section or another prefix information stored in the storage section if the keep configuration setting for maintaining the prefix information is set.

5. The apparatus of claim 4, wherein the prefix information stored by the storage section includes an IP address used in a network that adopts IPv6 (Internet Protocol ver. 6) as a network interface.

6. The apparatus of claim 4, wherein the prefix information received by the storage section from the router includes an IP address used in a network that adopts IPv6 (Internet Protocol ver. 6) as a network interface.

7. The apparatus of claim 4, wherein the storage section is further configured to store a maximum of seven instances of prefix information, and
when the stored number of instances of prefix information exceeds the maximum, the oldest stored prefix information is deleted.

8. The apparatus of claim 4, further comprising:
a user interface section configured to input a control signal.

9. The apparatus of claim 8, wherein
the control section configured to set a usage in whether to use either the prefix information stored in the storage section or another prefix information.

10. An image forming apparatus comprising:
a network interface section configured to receive prefix information of an IP address from a router;
a storage section configured to store the prefix information received by the network interface section from the router;
a detecting section configured to detect whether a keep configuration for maintaining prefix information is set;
a control section configured to set a usage of whether to use either the prefix information stored in the storage section or another prefix information according to the detecting section, wherein the control section uses the prefix information stored in the storage section if the keep configuration for maintaining the prefix information is set; and
a printer section configured to output an output image corresponding to image information inputs via the network interface.

11. The apparatus of claim 10, wherein the prefix information stored by the storage section includes an IP address used in a network that adopts IPv6 (Internet Protocol ver. 6) as a network interface.

12. The apparatus of claim 10, wherein the prefix information received by the storage section from the router includes an IP address used in a network that adopts IPv6 (Internet Protocol ver. 6) as a network interface.

13. The apparatus of claim 10, further comprising a scanner section that inputs the image information that should be outputted as an image.

14. The apparatus of claim 13, wherein the prefix information stored by the storage section includes an IP address used in a network that adopts IPv6 (Internet Protocol ver. 6) as a network interface.

15. The apparatus of claim 13, wherein the prefix information received by the storage section from the router includes an IP address used in a network that adopts IPv6 (Internet Protocol ver. 6) as a network interface.

16. The apparatus of claim 10, wherein the storage section is configured to store a maximum of seven instances of prefix information, and
when the stored number of instances of prefix information exceeds the maximum, the oldest instance of prefix information is deleted.

17. The apparatus of claim 10, further comprising:
a user interface section configured to input a control signal.

18. The apparatus of claim 17, wherein
the control section configured to set a usage in whether to use either the prefix information stored in the storage section or another prefix information.

* * * * *